US006476095B2

(12) United States Patent
Simendinger, III

(10) Patent No.: US 6,476,095 B2
(45) Date of Patent: Nov. 5, 2002

(54) ANTIFOULING COATING COMPOSITION

(75) Inventor: William H. Simendinger, III, Raleigh, NC (US)

(73) Assignee: Microphase Coatings, Inc., Garner, NC (US)

( * ) Notice: Subject to any disclaimer, the term of this patent is extended or adjusted under 35 U.S.C. 154(b) by 0 days.

(21) Appl. No.: 09/867,890

(22) Filed: May 30, 2001

(65) Prior Publication Data

US 2002/0010228 A1 Jan. 24, 2002

Related U.S. Application Data

(63) Continuation-in-part of application No. 09/781,876, filed on Feb. 12, 2001, which is a continuation-in-part of application No. 09/586,378, filed on Jun. 2, 2000, now Pat. No. 6,313,193.

(51) Int. Cl.$^7$ .............................. C08K 5/32; C08K 5/20; C08K 5/09; C08K 5/10
(52) U.S. Cl. ...................... 523/122; 524/95; 524/230; 524/300; 524/322; 524/399; 524/463; 524/490; 524/494; 524/588
(58) Field of Search .............................. 523/122; 524/95, 524/230, 300, 322, 399, 403, 490, 494, 588

(56) References Cited

U.S. PATENT DOCUMENTS

| | | | |
|---|---|---|---|
| 4,602,959 A | 7/1986 | Kurita et al. | 106/18.32 |
| 4,725,501 A | 2/1988 | Rukavina et al. | 428/412 |
| 4,814,017 A | 3/1989 | Yoldas et al. | 106/287.12 |
| 4,816,288 A | 3/1989 | Rukavina et al. | 427/387 |
| 4,990,547 A | 2/1991 | Stovicek | 424/405 |
| 5,068,277 A | 11/1991 | Rastko et al. | 524/441 |
| 5,096,488 A | 3/1992 | Stovicek | 106/18.32 |
| 5,173,110 A | 12/1992 | Stovicek | 106/18.32 |
| 5,218,059 A | 6/1993 | Kishihara et al. | 525/477 |
| 5,298,060 A | 3/1994 | Harakal et al. | 106/15.05 |
| 5,331,074 A | 7/1994 | Slater et al. | 528/14 |
| 5,433,941 A | 7/1995 | Patel | 424/50 |
| 5,593,732 A | 1/1997 | Griffith | 427/407.1 |
| 5,663,215 A | 9/1997 | Milligan | 523/122 |
| 5,688,851 A | 11/1997 | Kress | 524/430 |
| 5,958,116 A | 9/1999 | Kishihara et al. | 106/15.05 |
| 6,013,724 A | 1/2000 | Mizutani et al. | 524/588 |
| 6,045,869 A | 4/2000 | Gesser et al. | 427/385.5 |
| 6,313,193 B1 * | 11/2001 | Simendinger et al. | 523/122 |

FOREIGN PATENT DOCUMENTS

| | | | | |
|---|---|---|---|---|
| EP | 0 563 939 A1 | 10/1993 | | C09D/5/14 |
| EP | 0 664 322 A1 | 7/1995 | | C08L/83/07 |
| EP | 0 851 009 A2 | 7/1998 | | C09D/5/16 |

* cited by examiner

*Primary Examiner*—Kriellion A. Sanders
(74) *Attorney, Agent, or Firm*—Myers, Bigel, Sibley & Sajovec, PA

(57) ABSTRACT

The antifouling composition of the present invention includes a glassy matrix formed by crosslinking a mixture of a silanol-terminated silicone and an alkoxy-functionalized siloxane to provide an interpenetrating polymer network of glass and silicone and at least two materials capable of microphase separation, at least one of which is graftable to the glassy matrix. A primer composition is also provided and is a mixture of an epoxy, an alkoxy-functionalized siloxane and a silane capable of compatabilizing the epoxy and the alkoxy-functionalized siloxane; a glassy matrix formed by crosslinking a mixture of a silanol-terminated silicone and an alkoxy-functionalized siloxane.

82 Claims, No Drawings

ANTIFOULING COATING COMPOSITION

RELATED APPLICATION

This present application is a continuation-in-part of U.S. Ser. No. 09/586,378 filed Jun. 2, 2000 now U.S. Pat. No. 6,313,193 entitled "Antifouling Coating Composition" which is a continuation-in-part of U.S. Ser. No. 09/781,876 filed Feb. 12, 2001 entitled "Antifouling Coating Composition" the disclosures of which are incorporated herein by reference in its entirety.

FIELD AND BACKGROUND OF THE INVENTION

The present invention relates to an antifouling coating composition, and more particularly to an antifouling coating composition for use with underwater structures such as ships, port facilities, buoys, pipelines, bridges, submarine stations, submarine oil field excavation facilities, water conduit raceway tubes in power plants, cultivating fishing nets, stationary fishing nets. Such coating composition is suitable for preventing underwater living things from adhering and growing on the surface of the underwater structure.

Biofouling, the growth of barnacles, seaweeds, tubeworms and other marine organisms on the hulls of ocean-going vessels, and other underwater structures, cause the international marine community billions of dollars a year. In the case of ocean-going vessels, most of this money goes for the extra fuel needed to overcome the increased drag on vessels. Some of it is spent for hull cleaning and repainting and for the upkeep on propulsion equipment.

One currently used hull antifouling coating contains species such as tributyltin compounds or copper oxide and function through leaching of the toxicant into the marine environment. The resulting environmental hazards of introducing such toxicants into the marine ecosystem include disruption of natural ecocycles for many commercially important shellfish and pollution of entire food chains. The removal and disposal of toxicant-containing coatings from ships and other structures also pose separate environmental hazards, driving up the cost of refurbishment.

An alternative approach is to use acrylic acid monomer compositions which are water soluble, i.e., a polyester resin with an acrylic acid group. Such coatings include a biocide, which after a certain amount of time becomes inactive. The composition, because it is water soluble, wears off over time, i e., is ablative, and exposes new and active biocide at the surface. Such a composition is known as a self-polishing composition. Thus the alternative approach has been to employ a polymeric coating to function as a fouling release coating. Poly(dimethylsiloxane) ("PDMS")-based coatings have properties which meet some of those requirements. On the other hand, as noted, studies have shown that such a cured PDMS material becomes unstable when immersed in water for three months.

Another specific approach involves the use of a composition containing a majority by weight as resin-solid content a reaction-curable silicone resin composition, a silicone resin having the specific average molecular weight and viscosity and an alkoxy group at its molecular terminal. While such a composition exhibits non-toxic characteristics, it is silicone-based and in addition to the discussed disadvantages, subject to premature wear requiring frequent maintenance in the form of reapplication of the coating.

In accordance with the invention, an antifouling coating composition, which is a silicone modified glass, is provided which is extremely effective in preventing fouling, and which is highly durable over time. Also provided is a primer composition which is highly durable over time and permits a variety of antifouling compositions to be applied to various surfaces.

SUMMARY OF THE INVENTION

The antifouling composition of the present invention compromises a glassy matrix formed by crosslinking a mixture of a silanol-terminated silicone and an alkoxy-functionalized siloxane to provide an interpenetrating polymer network of glass and silicone and at least two materials capable of microphase separation, at least one of which is graftable to the glassy matrix.

The present invention also relates to a primer composition formed by crosslinking a mixture of an epoxy, an alkoxy-functionalized siloxane and a silane capable of compatabilizing the epoxy and the alkoxy-functionalized siloxane to provide an epoxy-modified interpenetrating polymer network of glass and epoxy.

The present invention also provides a method of treating a substrate to prevent fouling thereof. The method includes first applying to the substrate a primer composition formed by crosslinking a mixture of an epoxy, an alkoxy-functionalized siloxane and a silane capable of compatabilizing the epoxy and the alkoxy-functionalized siloxane to provide an epoxy-modified interpenetrating polymer network of glass and epoxy, and then applying a mixture of a silanol-terminated silicone and an alkoxy-functionalized siloxane, and at least two materials capable of microphase separation. Thereafter, the mixture is crosslinked to provide an interpenetrating polymer network of glass and silicone to which is grafted at least one of the materials capable of microphase separation. The crosslinking of the primer composition and the antifouling composition can occur substantially simultaneously using the same catalyst (e.g., titanium isopropoxide) or can occur separately.

Optionally the mixture/antifouling composition can include an agent capable of preventing or inhibiting slime (e.g., algae, bacteria, protozoa, diatoms, etc.) from growing on the surface of the coating. While in most cases, such agent will be included in the composition, there are instances when slime is not an issue, and the anti-slime agent can be omitted. Suitable agents capable of preventing or inhibiting slime include surfactants, emulsifiers, enzymes, silver compounds, quaternary amine compounds, sulfa-based antimicrobial compounds, saponin and cholesterol, and mixtures and blends thereof.

The present invention also provides a substrate such as a boat hull first coated with a primer composition formed by crosslinking a mixture of an epoxy, and alkoxy-functionalized siloxane and a silane capable of compatabilizing the epoxy and the alkoxy-functionalized siloxane to provide an epoxy-modified interpenetrating polymer network of glass and epoxy. The substrated includes a coated layer of an antifouling composition comprising a glassy matrix formed by crosslinking a mixture of a silanol-terminated silicone and an alkoxy-functionalized siloxane to provide an interpenetrating polymer network of glass and silicone; and at least two materials capable of microphase separation, at least one of which is graftable to the glass matrix.

DETAILED DESCRIPTION OF THE INVENTION

The present invention will be more fully understood by reference to the following description and examples. Variations and modifications of the embodiments of the invention can be substituted without departing from the principles of the invention, as will be evident to those skilled in the art.

The present invention is based on the discovery that a modified glassy matrix can be combined with at least two materials capable of microphase separation to make a uniform and tough antifouling coating for use on surfaces, particularly marine surfaces, in an underwater environment.

The glassy matrix serves to provide a carrier or support material composition. The matrix provides critical properties such as good adhesion to the substrate on which the formulation is applied as a coating, toughness, crack resistance, durability, abrasion resistance and stability in an aqueous environment. The glassy matrix is formed by crosslinking a mixture of a silanol-terminated silicone and alkoxy-functionalized siloxane to provide a silicate glass. Typically, the glassy matrix is crosslinked using a crosslinking agent such as an organotitanate or tin catalyst.

Suitable functionally-terminated silicones include silanol terminated, vinyl terminated and amino terminated polydimethylsiloxane. Such silicones have low tear strength and can be toughened by incorporating glass ($SiO_2$) into the structure. Thus, an alkoxy-functionalized siloxane can be included. Suitable alkoxy-functionalized siloxanes include polydiethoxysiloxane, tetraethoxy silane, tetramethoxy silane, and polydimethoxy siloxane.

One manner of forming the glassy matrix is using a Sol-Gel process employing a catalyst agent such as an organotitanate compound, for example, a titanium alkoxide compound such as titanium methoxide, titanium ethoxide, titanium isopropoxide, titanium propoxide, titanium butoxide, titanium ethylhexoxide, titanium diisopropoxide (bis 2,4 pentanedionate), titanium diisopropoxide bis (ethylacetoacetate), or any other type of titanium alkoxide compound. These titanium alkoxide compounds can be used separately or in any combination. Although titanium alkoxides are given as examples, other organotitanate compounds can be used. The glassy matrix can also include a carboxylic acid compound. Silica gel is optional to inhibit the crosslinking reaction. Silica gel is used if storage over a long period of time is an issue. This is because it stores moisture. Alternatively, only silica gel can be used in place of the carboxylic acid compound. However, this does not work as well and a lot of silica gel is required.

With respect to the Sol-Gel process, as is well know to those of ordinary skill in the art, the Sol-Gel process is conventional, and typically produces a Sol-Gel glass which results from an optically transparent amorphous silica or silicate material produced by forming interconnections in a network of colloidal submicrometer particles under increasing viscosity until the network becomes completely rigid, with about one-half the density of glass.

In addition, the matrix can also include means for inhibiting or slowing the crosslinking reaction. Exemplary means for inhibiting include propionic or octonoic acid. Such agents permit the surface of the substrate to be coated to be painted before the formulation cures or crosslinks.

The two materials capable of microphase separation serve to prevent barnacles or other organisms from attaching or staying attached to the coating and thus the substrate. The material comprises at least one material, preferably a liquid, which in addition to its separation aspects, one of which is capable of being grafted into the glassy matrix. A material capable of microphase separation is a material that because of physical or chemical interactions between (among) the materials substantially continuously phase separates or moves. Such separation or movement in effect provides a substantially constant scraping motion thereby preventing the build up of slim or foul on the surface of the substrate.

One of the materials capable of microphase separation and graftable into the glassy matrix may be a vinyl terminated polydimethyl siloxane polymer reacted with dimethylethoxy silane and triethyl silane using a hydrosilylation reaction. Another microphase separatable material which can be employed is a methylhydrosiloxane polymer which is side-chain grafted with octene and vinyltriethoxy silane using a platinum-activated hydrosilylation reaction. Similarly, any hydrocarbon compound having a carbon atom chain of up to C20 can be used. Yet still further a methylhydrosiloxane polymer which is side-chain grafted with styrene and vinyltriethoxy silane using a platinum-activated hydrosilylation reaction can also be used. In this regard, it is noted that the platinum catalyst serves to react the hydride and the vinyl in the initial formulation. No platinum curing occurs in the final product provided in the field. Yet still further, a liquid hydrocarbon, such as polydecene, can also be used. In addition, other materials such as octanoic acid, heptanoic acid, hexanoic acid, decanoic acid, lauric acid, oleic acid, linoleic acid, linolenic acid, stearic acid, or any carboxylic acid containing a linear carbon chain of up to about C20 can be employed. Similarly, aluminum oleate, aluminum stearate, copper oleate, copper stearate, calcium stearate, magnesium stearate, or any fatty acid salt complex can be employed. In this regard, it is noted that of the above components, oleic acid is preferred as is aluminum oleate and aluminum stearate. Another microphase separatable material which can be employed is fluorotelomer intermediate available as Zonyl® from duPont.

The antifouling composition optionally may include an agent capable of preventing slime growth such as algae, bacteria, protozoa, diatoms and the like. Particularly preferred are surfactants and emulsifiers such as sorbitan; mono-and tri-oleate (Span® products); polyoxyethylene sorbitan mono-oleate, polyoxyethylene sorbitan tri-oleate, and polyoxyethylene sorbitan mono-sterate (Tween® products); saponin; and cholesterol. Other suitable antifouling agents include silver compounds such as silver powder, silver oxide, silver chloride, silver carbonate, silver acetate and silver citrate; quaternary amine compounds such as cetrimide; isoniazid; benzalkonium chloride; and sulfa-based antimocrobial compounds such as sulfanilamide, sulfaguanidine, sulfathiazole, sulfacetamide, sulfabenzamide and sulfamethiazole. An exemplary antimicrobial compound is Irgarol™, which is a slime inhibitor manufactured by, and commercially available from Ciba Geigy Additional additives which can be added to the formulation and can include aminopropyltriethoxy silane which serves to increase adhesion and can be used, for example, when the coating composition is used on the running gear of a vessel. Fumed silica can be used for thixotropic control, i.e., to increase viscosity. Pigments can be used to alter the color, and certain phosphates can also be added for anticorrosion properties. The matrix can include various fillers and viscosity control agents such as mica, fumed silica, silica, kaolin, bentonite, zinc oxide, iron oxide, cellulose (preferably in powder form), polytetrafluoroethylene powder, ultra high molecular weight polyethylene powder, high, medium and low molecular weight polyethylene powder, or other appropriate fillers, as will be readily apparent to those of ordinary skill in the art, can be used.

The glassy matrix preferably comprises about 20 to 90 percent by weight of the composition; the liquid material capable of liquid phase separation preferably comprises about 1 to 30 percent by weight of the composition; and the agent capable of preventing slime preferably comprises about 0.1 to 25 percent by weight of the composition.

In operation, the antifouling composition of the present invention can be applied to a substrate by roll-coating, brush, spray coating dipping and the like. As discussed above, it is preferred that the user mix the catalyst with the other components right before or substantially contemporaneously with application to form the interpenetrating polymer network of glass and silicone on the surface of the substrate.

The substrate preferably is coated with a primer composition to facilitate adhesion of the antifouling composition to the surface of a substrate. A preferred primer composition is formed by crosslinking a mixture of an epoxy, an alkoxy-functionalized siloxane and a silane capable of compatabilizing the epoxy and the alkoxy-functionalized siloxane to provide the interpenetrating polymer network of glass and epoxy.

Epoxy compounds are well know and are described in, for example, U.S. Pat. Nos. 2,467,171; 2,615,007; 2,716,123; 3,030,336; and 3,053,855 which are incorporated herein in their entirety by reference. Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as 2,2-bis(4-hydroxyphenyl) propane (commonly known as bis-phenol A), 1,1-bis(4-hydroxyphenyl) ethane, 1,1-bis(4-hydroxyphenyl) isobutane, 4,4'-dihydroxybenzophenone, 2,2-bis(4-hydroxyphenyl) butane, bis(2-dihydroxynaphthyl) methane, phloroglucinol, bis(4-hydroxyphenyl)sulfone, 1,5-dihydroxynaphthalene, and novolak resins; with the polyglycidyl ethers of polyphenols being currently preferred. Generally the preferred epoxy compounds are resins having an epoxide equivalent weight of about 100 to 2000, preferably about 110 to 500. The presently preferred epoxy compound is a polyglycidyl ether of a polyphenol such as the polyglycidyl ether of bis-phenol A.

Suitable alkoxy functioanlized siloxanes, silanes, crosslinkers, fillers and other additives have been described previously. Preferably the primer composition comprises a primer composition, comprising: 10 to 35 percent by weight of an epoxy; 10 to 25 percent by weight of an alkoxy-functionalized siloxane; and 6 to 15 percent by weight of a silane capable of compatabilizing the epoxy and the alkoxy-functionalized siloxane.

ANTIFOULING FORMULATION EXAMPLES

Examples

The present invention is illustrated in greater detail by the following examples and comparative examples, in which "part" means "part by weight" unless otherwise expressed. The examples are not to be construed as limiting the scope of the present invention.

Example 1

| % by Weight: | Component: |
|---|---|
| 14.35 | 100 cs polydimethylsiloxane silanol terminated |
| 4.91 | octanoic acid or propiomc acid |
| 19.25 | polydiethoxysiloxane |
| 2.45 | silica gel |
| 20.38 | titanium isopropoxide |
| 26.16 | mica (muscovite) |
| 5.0* | 1000 cs polydimethylsiloxane (triethyl silane and dimethyl ethoxy silane terminated) |
| 5.0* | poly (octylmethyl-co-vinyltriethoxy silane methyl siloxane) |
| 2.5 | silver powder |

Example 2

| % by Weight: | Component: |
|---|---|
| 16.43 | titanium isopropoxide |
| 8.15 | oleic acid |
| 15.50 | polydiethoxy siloxane |
| 25.83 | mica (50 micron) |
| 11.59 | 100 cs polydimethylsiloxane silanol terminated |
| 10.0* | poly (octylmethyl-co-vinyltriethoxy silane methyl siloxane) |
| 10.0* | 1000 cs polydimethylsiloxane (triethyl silane and dimethyl ethoxy silane terminated) |
| 2.5 | silver oxide (1.0 micron) |

*Phase separate components

Example 3

| % by Weight: | Component: |
|---|---|
| 18.55 | titanium isopropoxide |
| 9.20 | oleic acid |
| 17.49 | polydiethoxy siloxane |
| 29.21 | mica (50 micron) |
| 13.05 | 100 cs polydimethylsiloxane silanol terminated |
| 5.0* | poly (octylmethyl-co-vinyltriethoxy silane methyl siloxane) |
| 5.0* | 1000 cs polydimethylsiloxane (triethyl silane and dimethyl ethoxy silane terminated) |
| 2.5 | Silver oxide (1.0 micron) |

*Phase separate components

Example 4

| % by Weight: | Component: |
|---|---|
| 17.48 | titanium isopropoxide |
| 8.76 | oleic acid |
| 16.48 | polydiethoxy siloxane |
| 27.54 | mica (50 micron) |
| 11.27 | 100 cs polydimethylsiloxane silanol terminated |
| 3.74* | poly (octylmethyl-co-vinyltriethoxy silane methyl siloxane) |
| 11.27* | 1000 es polydimethylsiloxane (triethyl silane and dimethyl ethoxy silane terminated) |
| 2.5 | silver oxide (1.0 micron) |

*Phase separate components

Example 5

| % by Weight: | Component: |
|---|---|
| 17.48 | titanium isopropoxide |
| 8.67* | oleic acid |
| 16.48 | polydiethoxy siloxane |
| 27.55 | mica (50 micron) |
| 12.32 | 100 cs polydimethylsiloxane silanol terminated |
| 10.0* | 1000 cs polydimethylsiloxane (triethyl silane and dimethyl ethoxy silane terminated) |
| 2.5 | silver oxide (1.0 micron) |

*Phase separate components

Example 6

| % by Weight: | Component: |
|---|---|
| 16.93 | titanium isopropoxide |
| 4.3 | heptanoic acid |
| 15.99 | polydiethoxy siloxane |
| 28.36 | mica (50 micron) |
| 11.92 | 100 cs polydimethylsiloxane silanol terminated |
| 20.0* | poly (octyl methyl-co-ethylbenzene methyl-co-vinyl triethoxysilane methyl siloxane) |
| 2.5 | silver powder (1.0 micron) |

*Phase separate components

Example 7

| % by Weight: | Component: |
|---|---|
| 17.94 | titanium isopropoxide |
| 10.0* | oleic acid |
| 16.94 | polydiethoxy siloxane |
| 30.0 | mica (50 micron) |
| 12.62 | 100 cs polydimethylsiloxane silanol terminated |
| 10.0* | 1000 cs polydimethylsiloxane (triethyl silane and dimethyl ethoxy silane terminated) |
| 2.5 | silver powder (1.0 micron) |

*Phase separate components

Example 8

| % by Weight: | Component: |
|---|---|
| 16.93 | titanium isoproposide |
| 4.30 | heptanoic acid |
| 15.99 | polydiethoxy siloxane |
| 28.36 | mica (50 micron) |
| 11.92 | 100 cs polydimethylsiloxane silanol terminated |
| 10.0* | 1000 cs polydimethylsiloxane (triethylsilane and dimethyl ethoxy silane terminated) |
| 2.5 | silver powder (1.0 micron) |

*Phase separate components

Example 9

| % by Weight: | Component: |
|---|---|
| 16.93 | titanium isopropoxide |
| 4.30 | heptanoic acid |
| 15.99 | polydiethoxy siloxane |
| 28.39 | mica (50 micron) |
| 11.92 | 100 cs polydimethylsiloxane silanol terminated |
| 5.0* | aluminum oleate |
| 15.0* | 1000 cs polydimethylsiloxane (triethyl silane and dimethyl ethoxy silane terminated) |
| 2.5 | silver powder (1.0 micron) |

*Phase separate components

Example 10

| % by Weight: | Component: |
|---|---|
| 18.75 | titanium isopropoxide |
| 17.70 | polydiethoxy siloxane |
| 4.88 | propionic acid |
| 29.51 | mica (muscovite) |
| 16.61 | 100 cs polydimethylsiloxane silanol terminated |
| 10.0* | 1000 cs polydimethylsiloxane-dimethyl ethoxy silane terminated |
| 3.0 | benzalkonium chloride* |

*Benzalkonium chloride contains alkyl carbon chains from C14 to C20. As a result, this material can be both a phase separation component and an effective slimicide.

As may be appreciated, in order to commercially provide the components for the coating, they must be kept separated so that a reaction does not occur prior to application on the surface. Thus, a typical commercial product is provided in two parts as follows:

Example 11

| | % by Volume of A & B | Component |
|---|---|---|
| Part A | | |
| % by Volume of A | | |
| 32.00 | 16.16 | 100 cs polydimethylsiloxane silanol terminated |
| 19.77 | 10.00 | 1000 cs polydimethylsiloxane dimethyl ethoxy silane terminated |
| 35.34 | 17.70 | polydiethoxy siloxane |
| 12.88 | 29.51 | mica |
| Part B | | |
| % by Volume of B | | |
| 37.90 | 18.75 | titanium isopropoxide |
| 9.87 | 4.88 | propionic acid |
| | 17.70 | polydiethoxy siloxane |
| 6.10 | 3.00 | benzalkonium chloride |
| 46.13 | 29.51 | mica |

In preparing the mixture for being applied, parts A and B, for all formulations, should be combined and mixed using a mechanical mixing device for about three (3) to about five (5) minutes. Such a device can be a paint shaker, electrically powered stirrer or like device. After mixing, the coating can be kept in a sealed container for up to about six (6) hours before use. When applied, for example, with brush, roller, or sprayer, curing of the coating occurs rapidly as it is fashioned into a thin layer on the surface. The coating will be substantially tack free in about fifteen (15) to about thirty (30) minutes, and will be serviceable after about twenty-four (24) hours. Increased temperature and/or humidity will increase the cure rate, but the coating can still be applied at temperatures of about 32° F. to about 100° F.

In the previous discussion specific viscosities have been given for the hydro or hydroxy functionalized silicones. However, the formulation for the hydro or hydroxy functional silicones is not limited to those viscosities and can range from about 20 to about 115,000 centistokes. In terms of molecular weight, this corresponds to a molecular weight of about 400 g/mol to about 140,000 g/mol. The vinyl functionalized silicone polymers are typically described previously as being 1000 centistokes, but can also range from about 0.7 centistokes to about 165,000 centistokes, or about 186 g/mol to about 155,000 g/mol.

With respect to titanate silicate ratios, the ratio of the titanate to silicate can vary from about 1 mol % of the reactive titanate groups to about 99 mol % reactive silicate groups to about 99 mol % of the reactive titanate groups to about 1 mol % of the reactive silicate groups. An example of this is as follows. Polydiethoxy siloxane contains two reactive groups per molecular repeat unit. Titanium isopropoxide contains four (4) reactive molecular groups per molecule. A fifty percent (50%) ratio of the reactive groups would mean that there would be one half (½) mole of titanium isopropoxide per 1 mole polydiethoxy siloxane molecular repeat units. A twenty-five percent (25%) ratio would mean that there would be one (1) mole of titanium isopropoxide per six (6) moles of polydiethoxy siloxane repeat units. In this regard a preferred ratio would be about 50/50, with a most preferred ratio being about 25 titanate and about 75 silicate. The most preferred ratio enhances bonding to the filler material.

In terms of two-part commercial availability as discussed above, other two-part formulations are set forth in the following additional examples.

Example 12

| | Component: |
|---|---|
| Part A | |
| Volume % A | |
| 21.34 | 100 cs polydimethyl siloxane-silanol terminated |
| 38.96 | poly(octyl methyl-co-ethylbenzene methyl-co-methyl vinyl triethoxy silane siloxane |
| 29.39 | polydiethoxy siloxane |
| 10.30 | mica (muscovite) |
| Part B | |
| Volume % B | |
| 64.09 | titanium isopropoxide |
| 16.59 | heptanoic acid |
| | Polydiethoxy Siloxane |
| 19.32 | mica (muscovite) |

Mix Ratio is 64.65% A to 35.35% B by volume.

This commercial embodiment corresponds to Example 5 as previously described.

Example 13

| | Component: |
|---|---|
| Part A | |
| Volume % A | |
| 28.77 | 100 cs polydimethyl siloxane-silanol terminated |
| 22.80 | 1000 cs polydimethyl siloxane (triethyl silane and dimethyl ethoxy terminated) |
| 35.67 | poly(diethoxy siloxane) |
| 12.76 | mica (muscovite) |
| Part B | |
| Volume % B | |
| 52.50 | titanium isopropoxide |
| 30.73 | oleic acid |
| | poly (diethoxy siloxane) |
| 15.81 | mica (muscovite) |
| 0.96 | silver powder (1.0 micron) |

Mix ratio is 55.35% A to 44.65 B by volume

This commercial embodiment corresponds to Example 6 as previously described.

Example 14

| | Component |
|---|---|
| Part A | |
| Volume % A | |
| 22.23 | 100 cs polydimethyl siloxane-silanol terminated |
| 18.64 | 1000 cs polydimethyl siloxane (triethyl silane and dimethyl ethoxy terminated) |
| 21.70 | poly(decene) |
| 27.55 | poly(diethoxy siloxane) |
| 9.87 | mica (muscovite) |
| Part B | |
| Volume % B | |
| 63.28 | titanium isopropoxide |
| 16.38 | heptanoic acid |
| | poly (diethoxy siloxane) |
| 19.12 | mica (muscovite) |
| 1.22 | silver powder (1.0 micron) |

Mix ratio is 65.95% A to 34.05 B by volume

This commercial embodiment corresponds to Example 7 as previously described.

Example 15

| | Component |
|---|---|
| Part A | |
| Volume % A | |
| 25.34 | 100 cs polydimethyl siloxane-silanol terminated |
| 31.94 | 1000 cs polydimethyl siloxane (triethyl silane and dimethyl ethoxy terminated) |
| 31.46 | poly(diethoxy siloxane) |
| 11.26 | mica (muscovite) |
| Part B | |
| Volume % B | |
| 53.87 | titanium isopropoxide |
| 13.95 | heptanoic acid |
| | poly (diethoxy siloxane) |

| Component | |
|---|---|
| 14.90 | aluminum oleate |
| 16.25 | mica (muscovite) |
| 1.03 | silver powder (1.0 micron) |

Mix ratio is 59.07% A to 40.93% B by volume

This commercial embodiment corresponds to Example 8 as previously described.

Example 16

| Component | |
|---|---|
| Part A Volume % A | |
| 23.07 | 100 cs polydimethyl siloxane-silanol terminated |
| 19.71 | 1000 cs polydimethyl siloxane (triethyl silane and dimethyl ethoxy terminated) |
| 19.71 | poly(octyl methyl-co-methyl vinyl triethoxy silane siloxane) |
| 28.23 | poly(diethoxy siloxane) |
| 9.28 | mica (muscovite) |
| Part B Volume % B | |
| 54.82 | titanium isopropoxide |
| 28.58 | oleic acid |
| | poly (diethoxy siloxane) |
| 15.53 | mica (muscovite) |
| 1.07 | silver powder (1.0 micron) |

Mix ratio is 62.05% A to 37.95% B by volume

This commercial embodiment corresponds to Example 1 as previously described.

Example 17

| Component | |
|---|---|
| Part A Volume % A | |
| 29.22 | 100 cs polydimethyl siloxane-silanol terminated |
| 11.18 | 1000 cs polydimethyl siloxane (triethyl silane and dimethyl ethoxy terminated) |
| 11.18 | poly(octyl methyl-co-methyl vinyl triethoxy silane siloxane) |
| 36.19 | poly(diethoxy siloxane) |
| 12.23 | mica (muscovite) |
| Part B Volume % B | |
| 54.83 | titanium isopropoxide |
| 28.62 | oleic acid |
| | poly (diethoxy siloxane) |
| 15.57 | mica (muscovite) |
| 0.97 | silver powder (1.0 micron) |

Mix ratio is 56.05% A to 43.95% B by volume

This commercial embodiment corresponds to Example 2 as previously described.

Example 18

| Component | |
|---|---|
| Part A Volume % A | |
| 24.19 | 100 cs polydimethyl siloxane-silanol terminated |
| 24.19 | 1000 cs polydimethyl siloxane (triethyl silane and dimethyl ethoxy terminated) |
| 8.03 | poly(octyl methyl-co-methyl vinyl triethoxy silane siloxane) |
| 32.56 | poly(diethoxy siloxane) |
| 11.04 | mica (muscovite) |
| Part B Volume % B | |
| 54.80 | titanium isopropoxide |
| 28.58 | oleic acid |
| | poly (diethoxy siloxane) |
| 15.57 | mica (muscovite) |
| 1.04 | silver powder (1.0 micron) |

Mix ratio is 58.74% A to 41.26% B by volume

This commercial embodiment corresponds to Example 3 as previously described.

Example 19

| Component | |
|---|---|
| Part A Volume % A | |
| 28.86 | 100 cs polydimethyl siloxane-silanol terminated |
| 23.43 | 1000 cs polydimethyl siloxane (triethyl silane and dimethyl ethoxy terminated) |
| 35.67 | poly(diethoxy siloxane) |
| 12.04 | mica (muscovite) |
| Part B Volume % B | |
| 54.80 | titanium isopropoxide |
| 28.59 | oleic acid |
| | poly (diethoxy siloxane) |
| 15.57 | mica (muscovite) |
| 1.05 | silver powder (1.0 micron) |

Mix ratio is 56.39% A to 43.61% B by volume

This commercial embodiment corresponds to Example 4 as previously described.

Example 20

| % by Weight: | Component: |
|---|---|
| 15.27 | titanium isopropoxide |
| 3.98 | propionic acid |
| 28.77 | polydiethoxy siloxane |
| 24.75 | mica (50 micron) |
| 17.19 | 100 cs polydimethylsiloxane-silanol terminated |
| 5.02* | 1000 cs polydimethyl siloxane (triethyl silane and dimethyl ethoxy silane terminated) |
| 5.22 | benzalkonium chloride |

*Phase separate components

This total formulation would be provided commercially in two parts as follows:

| Component | |
|---|---|
| Part A | |
| Volume % A | |
| 32.18 | 100 cs polydimethyl siloxane-silanol terminated |
| 9.41 | 1000 cs polydimethyl siloxane (triethyl silane and dimethyl ethoxy terminated) |
| 49.77 | poly (diethoxy siloxane) |
| 8.64 | mica (muscovite) |
| Part B | |
| Volume % B | |
| 53.88 | titanium isopropoxide |
| 13.26 | propionic acid |
| | poly (diethoxy siloxane) |
| 15.73 | mica (muscovite) |
| 17.13 | benzalkonium chloride |

Mix ratio is 64.55% A to 35.45% B by volume

Example 21

| % by Weight: | Component: |
|---|---|
| 13.93 | titanium isopropoxide |
| 3.6 | propionic acid |
| 26.25 | polydiethoxy siloxane |
| 22.58 | mica (50 micron) |
| 23.56 | 100 cs polydimethylsiloxane-silanol terminated |
| 5.02* | 1000 cs polydimethyl siloxane (triethyl silane and dimethyl ethoxy silane terminated) |
| 5.02* | benzalkonium chloride |

*Phase separate components

This total formulation would be provided commercially in two parts as follows:

| Component | |
|---|---|
| Part A | |
| Volume % A | |
| 37.96 | 100 cs polydimethyl siloxane-silanol terminated |
| 8.09 | 1000 cs polydimethyl siloxane (triethyl silane and dimethyl ethoxy terminated) |
| 39.07 | poly (diethoxy siloxane) |
| 6.78 | mica (muscovite) |
| 8.01 | benzalkonium chloride |
| Part B | |
| Volume % B | |
| 64.96 | titanium isopropoxide |
| 16.04 | propionic acid |
| | poly (diethoxy siloxane) |
| 19.0 | mica (muscovite) |

Mix ratio is 73.65% A to 26.35% B by volume

Example 22

| % by Weight: | Component: |
|---|---|
| 14.72 | titanium isopropoxide |
| 3.84 | propionic acid |
| 27.74 | polydiethoxy siloxane |
| 23.86 | mica (50 micron) |
| 16.57 | 100 cs polydimethylsiloxane-silanol terminated |
| 10.28* | 1000 cs polydimethyl siloxane (triethyl silane and dimethyl ethoxy silane terminated) |
| 2.99* | benzalkonium chloride |

*Phase separate components

This total formulation would be provided commercially in two parts as follows:

| Component | |
|---|---|
| Part A | |
| Volume % A | |
| 29.11 | 100 cs polydimethyl siloxane-silanol terminated |
| 18.06 | 1000 cs polydimethyl siloxane (triethyl silane and dimethyl ethoxy terminated) |
| 45.02 | poly (diethoxy siloxane) |
| 7.81 | mica (muscovite) |
| Part B | |
| Volume % B | |
| 57.65 | titanium isopropoxide |
| 14.22 | oleic acid |
| | poly (diethoxy siloxane) |
| 16.82 | mica (muscovite) |
| 11.31 | benzalkonium chloride |

Mix ratio is 68.28% A to 31.72% B by volume

Example 23

| % by Weight: | Component: |
|---|---|
| 15.18 | titanium isopropoxide |
| 4.0 | propionic acid |
| 28.59 | polydiethoxy siloxane |
| 24.60 | mica (50 micron) |
| 17.08 | 100 cs polydimethylsiloxane-silanol terminated |
| 10.59 | 1000 cs polydimethyl siloxane (triethyl silane and dimethyl ethoxy silane terminated) |

This total formulation would be provided commercially in two parts as follows:

| Component | |
|---|---|
| Part A | |
| Volume % A | |
| 29.12 | 100 cs polydimethyl siloxane-silanol terminated |
| 18.05 | 1000 cs polydimethyl siloxane (triethyl silane and dimethyl ethoxy terminated) |
| 45.01 | poly (diethoxy siloxane) |
| 7.82 | mica (muscovite) |

-continued

| Component | |
|---|---|
| Part B | |
| Volume % B | |
| 64.90 | titanium isopropoxide |
| 16.15 | propionic acid |
|  | poly (diethoxy siloxane) |
| 18.95 | mica (muscovite) |

Mix ratio is 70.8% A to 29.2% B by volume

Example 24

| % by Weight: | Component: |
|---|---|
| 17.36 | titanium isopropoxide |
| 4.0 | heptanoic acid |
| 16.39 | polydiethoxy siloxane |
| 27.32 | mica (50 micron) |
| 14.97 | 100 cs polydimethylsiloxane-silanol terminated |
| 7.49* | 1000 cs polydimethyl siloxane (triethyl silane and dimethyl ethoxy silane terminated) |
| 7.49* | 500 cs poly (15% diphenyl-co-dimethyl siloxane) (triethyl silane and dimethyl ethoxy silane terminated) |
| 4.99 | benzalkonium chloride |

*Phase separation components

This total formulation would be provided commercially in two parts as follows:

| Component | |
|---|---|
| Part A | |
| Volume % A | |
| 29.84 | 100 cs polydimethyl siloxane-silanol terminated |
| 14.92 | 1000 cs polydimethyl siloxane (triethyl silane and dimethyl ethoxy terminated) |
| 14.92 | 500 cs poly (15% diphenyl-co-dimethyl siloxane) (triethyl silane and dimethyl ethoxy silane terminated) |
| 30.16 | poly (diethoxy siloxane) |
| 10.16 | mica (muscovite) |
| Part B | |
| Volume % B | |
| 55.68 | titanium isopropoxide |
| 13.10 | heptanoic acid |
|  | poly (diethoxy siloxane) |
| 15.77 | mica (muscovite) |
| 15.45 | benzalkonium chloride |

Mix ratio is 60.85% A to 39.15% B by volume

Example 25

A hard composition can be formulated as follows:

| Component | |
|---|---|
| Part A | |
| Volume % A | |
| 30.07 | Polydiethoxy Siloxane |
| 16.01 | Silanol Terminated Polydimethyl Siloxane 4200 g/mol |
| 9.15 | Fumed Silica |
| 0.45 | Copper Phthalocyanine Blue Pigment |
| 10.77 | Dimethyl ethoxy and Triethyl silane terminated PDMS Starting material is vinyl terminated PDMS 26,000 g/mol |
| 9.26 | Polydecene |
| 9.97 | Certrimide |
| Part B | |
| Volume % B | |
| 13.72 | Titanium di-isopropoxide bis 2,4 pentanedionate 75% in isopropanol |
| 0.60 | Dibutyl Tin Dilaurate |

Example 26

A rubbery composition can be formulated as follows:

| Component | |
|---|---|
| Part A | |
| Volume % A | |
| 20.64 | Polydiethoxy Siloxane |
| 32.95 | Silanol Terminated Polydimethyl Siloxane 4200 g/mol |
| 6.27 | Fumed Silica |
| 0.31 | Copper Plithocyanine Blue Pigment |
| 10.51 | Dimethyl ethoxy and Triethyl silane terminated PDMS Starting material is vinyl terminated PDMS 26,000 g/mol |
| 9.30 | Polydecene |
| 10.0 | Cetrimide |
| Part B | |
| Volume % B | |
| 9.42 | Titanium di-isopropoxide bis 2,4 pentanedionate 75% in isopropanol |
| 0.60 | Dibutyl Tin Dilaurate |

As may be appreciated, in providing the formulation to an end user, the organotitanate is maintained separate from the other components, particularly the polydimethyl siloxane silanol terminated and the polydiethoxy siloxane, to prevent the matrix from crosslinking and setting, such that all of the other components making up the formulation, can later be mixed together by an end user, in whatever mixture is appropriate provided the above-mentioned components are kept separate and the formulation can then either be brushed, rolled or sprayed onto the surface which is being coated.

Primer Formulation Examples

Example 27

| Weight | Component |
| --- | --- |
| 20.8 | Poly(Biphenol A- co- epichlorohydrin) glycidyl end-capped |
| 20.8 | Poydiethoxy siloxane |
| 20.8 | Titanium Isopropoxide |
| 8.4 | (3-Glycidoxypropyl) Timethoxy silane |
| 20.8 | Mica Muscovite |
| 8.4 | Titanium Dioxide Pigment |

Testing Examples

One of the simplest and most effective ways to test the release properties of the coating is to use a tape adhesion test. Testing is conducted by applying the tape to the surface of the coating and counting the number of seconds required for it to release from the surface due to the force generated by the curl of the backing. Good samples will show an instantaneous release, moderate samples will take 5 to 20 seconds, and poor samples will not release.

The tape adhesion tests results can change significantly after samples have been placed in water immersion. Samples that demonstrate good release will have absolutely no release after 24 hours immersion in a water bath at 80° F. The change in the tape adhesion tests indicates that the surface morphology of the coating changes when placed in water immersion. Increased temperature accelerates the process.

Example 28

| % by Weight | Component |
| --- | --- |
| 14.00 | Polydiethoxy Siloxane |
| 14.00 | Polydimethyl Siloxane Silanol Terminated |
| 3.24 | Titanium Di-isopropoxide (bis 2,4 pentanedionate) |
| 0.30 | Pigment |
| 0.30 | Tin Acetate |
| 0.30 | Titanium Isopropoxide |
| 11.25 | Ultrahigh Molecular Weight Polyethylene (Filler) |
| 4.82 | Polytetrafluoroethylene (Rheology control) |
| 4.82 | Silicone Oil |
| 4.82 | Sorbitan Trioleate |

Example 28 demonstrates good tape release prior to water immersion. However, after 24 hours water immersion the tape does not release from the coating at all. This occurs because the silicone oil that provides the release is not grafted to the matrix and migrates out of the coating during immersion.

Example 29

| % by Weight | Component |
| --- | --- |
| 14.00 | Polydiethoxy Siloxane |
| 14.00 | Polydimethyl Siloxane Silanol Terminated |
| 3.24 | Titanium Di-isopropoxide (bis 2,4 pentanedionate) |
| 0.30 | Pigment |
| 0.30 | Tin Acetate |
| 0.30 | Titanium Isopropoxide |
| 11.25 | Ultrahigh Molecular Weight Polyethylene (Filler) |
| 4.82 | Polytetrafluoroethylene (Rheology control) |
| 4.82 | Monofunctionally Terminated Silicone |

Example 29 demonstrates good tape release before water immersion, but shows moderate to poor release after 24 hours immersion. We believe this occurs due to changes in surface morphology. Silicone is inherently hydrophobic, consequently, when placed in an aqueous environment the mobile silicone polymer will adopt a conformation which minimizes the energetic interaction with water. This conformational change is detrimental to the release properties of the coating.

Example 30

| % by Weight | Component |
| --- | --- |
| 14.00 | Polydiethoxy Siloxane |
| 14.00 | Polydimethyl Siloxane Silanol Terminated |
| 3.24 | Titanium Di-isopropoxide (bis 2,4 pentanedionate) |
| 0.30 | Pigment |
| 0.30 | Tin Acetate |
| 0.30 | Titanium Isopropoxide |
| 11.25 | Ultrahigh Molecular Weight Polyethylene (Filler) |
| 4.82 | Polytetrafluoroethylene (Rheology control) |
| 4.82 | Sorbitan Trioleate |

Example 30 contains only sorbitan trioleate with no mobile silicone. This sample has moderate release properties prior to water immersion but will not release the tape after 24 hours immersion.

Example 31

| % by Weight | Component |
| --- | --- |
| 14.00 | Polydiethoxy Siloxane |
| 14.00 | Polydimethyl Siloxane Silanol Terminated |
| 3.24 | Titanium Di-isopropoxide (bis 2,4 pentanedionate) |
| 0.30 | Pigment |
| 0.30 | Tin Acetate |
| 0.30 | Titanium Isopropoxide |
| 11.25 | Ultrahigh Molecular Weight Polyethylene (Filler) |
| 4.82 | Polytetrafluoroethylene (Rheology control) |
| 4.82 | Monofunctioanlly Terminated Silicone |
| 4.82g | Sorbitan Trioleate |

Example 31 contains the monofunctionally terminated silicone and sorbitan trioleate (phase separation material). Prior to water immersion the tape release properties will be good. After more than a week in water immersion the sample will display almost the same level of tape release prior to immersion. We believe this occurs because of two factors. First, the monofunctionally terminated silicone is bound to the coating and cannot migrate out of the coating during water immersion. Second, the addition of sorbitan trioleate, which phase separates from the silicone, changes the thermodynamic balance between the monofunctionally terminated silicone and the water. In this case, due to the presence of the immiscible sorbitan trioleate, the free energy of the system is increased when the polymer attempts to coil up on the surface of the coating. Hence, a lower energy conformation is obtained when the polymer is away from the surface and interacting with water. This results in good release properties.

The foregoing is illustrative of the present invention and is not to be construed as limiting thereof. The invention is defined by the following claims, with equivalents of the claims to be included therein.

That which is claimed is:

1. An antifouling composition, comprising:
    a) a glassy matrix formed by crosslinking a mixture of a silanol-terminated silicone and an alkoxy-functionalized siloxane to provide an interpenetrating polymer network of glass and silicone; and
    b) at least two materials capable of microphase separation, at least one of which is graftable to the glass matrix.

2. The antifouling composition according to claim 1, further including an agent capable of preventing the deposition of slime.

3. The antifouling coating composition according to claim 2, wherein the agent capable of preventing the deposition of slime is selected from the group consisting of a surfactant, an emulsifier, an enzyme, a quaternary amine compound, a silver compound, a sulfa-based antimicrobial compound, saponin, and cholesterol, and mixtures and blends thereof.

4. The antifouling composition according to claim 1, wherein the functionally-terminated silicone is a silanol terminated, vinyl terminated or amine-terminated polydimethylsiloxane.

5. The antifouling composition according to claim 1, wherein the alkoxy-functionalized siloxane is selected from the group consisting of polydiethoxysiloxane, polydimethoxysiloxane, tetramethoxy silane and tetraethoxy silane.

6. The antifouling composition according to claim 1, wherein one of the materials capable of microphase separation and graftable into the glassy matrix is vinyl-terminated polydimethylsiloxane polymer reacted with dimethylethoxy silane and triethyl silane using a hydrosilylation reaction.

7. The antifouling composition according to claim 1, wherein one of the materials capable of microphase separation is polydecene.

8. The antifouling composition according to claim 1, wherein one of the materials capable of microphase separation is a fluorotelomer intermediate.

9. The antifouling composition according to claim 1, wherein one of the materials of microphase separation and graftable into the glassy matrix is derived from a carboxylic acid containing a linear carbon chain of up to about C20.

10. The antifouling composition according to claim 9, wherein the carboxylic acid is selected from the group consisting of octanoic acid, heptanoic acid, hexanoic acid, decanoic acid, lauric acid, oleic acid, linoleic acid, linolenic acid and stearic acid.

11. The antifouling composition according to claim 1, wherein one of the materials capable of microphase separation is derived from a metal fatty acid complex.

12. The antifouling composition according to claim 11, wherein the metal fatty acid complex is selected from the group consisting of aluminum, magnesium, calcium and copper oleate and aluminum, magnesium, calcium, and copper stearate.

13. The antifouling composition according to claim 1, wherein one of the materials capable of microphase separation and graftable into the glassy matrix is an alkylhydrosiloxane polymer side-chained grafted with an alkene and vinyltriethoxy silane using a hydrosilylation reaction.

14. The antifouling composition according to claim 13, wherein the alkylhydrosiloxane polymer is methylhydroxysiloxane and the alkene is octene or styrene.

15. The antifouling composition according to claim 1, wherein the glassy matrix is crosslinked using an organotitanate or tin catalyst agent.

16. The antifouling composition according to claim 1, further including a filler selected from the group consisting of mica, silica, kaolin, bentonite, talc, zinc oxide, polytetrafluoroethylene powder, ultrahigh molecular weight polyethylene powder, high molecular weight polyethylene powder, medium and low molecular weight polyethylene powder, fumed silica, iron oxide and cellulose.

17. A substrate coated with the antifouling composition according to claim 1.

18. An antifouling composition, comprising:
    (a) 20 to 90 percent by weight of a glassy matrix formed by crosslinking a mixture of a silanol-terminated silicone and an alkoxy-functionalized siloxane to provide an interpenetrating polymer network of glass and silicone;
    (b) 1 to 30 percent by weight of at least two materials capable of microphase separation, at least one of which is graftable to the glass matrix; and
    (c) 0.1 to 25 percent by weight of an agent capable of preventing slime.

19. The antifouling coating composition according to claim 18, wherein the agent capable of preventing the deposition of slime is selected from the group consisting of a surfactant, an enzyme, a quaternary amine compound, a silver compound, a sulfa-based antimicrobial compound, saponin and cholesterol, and mixtures and blends thereof.

20. The antifouling composition according to claim 18, wherein the functionally-terminated silicone is a silanol-terminated, vinyl-terminated or amine-terminated polydimethylsiloxane.

21. The antifouling composition according to claim 18, wherein the alkoxy-functionalized siloxane is selected from the group consisting of polydiethoxysiloxane, polydimethoxysiloxane, tetramethoxy silane and tetraethoxy silane.

22. The antifouling composition according to claim 18, wherein one of the materials capable of microphase separation and graftable into the glassy matrix is vinyl terminated polydimethylsiloxane polymer reacted with dimethylethoxy silane and triethyl silane using a hydrosilylation reaction.

23. The antifouling composition according to claim 18, wherein one of the materials capable of microphase separation is polydecene.

24. The antifouling composition according to claim 18, wherein one of the materials capable of microphase separation is a fluorotelomer intermediate.

25. The antifouling composition according to claim 18, wherein one of the materials of microphase separation and graftable into the glassy matrix is derived from a carboxylic acid containing a linear carbon chain of up to about C20.

26. The antifouling composition according to claim 25, wherein the carboxylic acid is selected from the group consisting of octanoic acid, heptanoic acid, hexanoic acid, decanoic acid, lauric acid, oleic acid, linoleic acid, linolenic acid and stearic acid.

27. The antifouling composition according to claim 18, wherein one of the materials capable of microphase separation is derived from a metal fatty acid complex.

28. The antifouling composition according to claim 27, wherein the metal fatty acid complex is selected from the group consisting of aluminum, magnesium, calcium, and copper oleate and aluminum, magnesium, calcium, and copper stearate.

29. The antifouling composition according to claim 18, wherein one of the materials capable of microphase separation and graftable into the glassy matrix is an alkylhydrosiloxane polymer side-chained grafted with an alkene and vinyltriethoxy silane using a hydrosilylation reaction.

30. The antifouling composition according to claim 29, wherein the alkylhydrosiloxane polymer is methylhydroxysiloxane and the alkene is octene or styrene.

31. The antifouling composition according to claim 18, wherein the glassy matrix is crosslinked using an organotitanate or tin catalyst agent.

32. The antifouling composition according to claim 18, further including a filler selected from the group consisting of mica, silica, kaolin, bentonite, talc, zinc oxide, polytetrafluoroethylene powder, ultrahigh molecular weight polyethylene powder, high, medium and low molecular weight polyethylene powder, fumed silica, iron oxide and cellulose.

33. A substrate coated with the antifouling composition according to claim 18.

34. A primer composition formed by crosslinking a mixture of an epoxy, an alkoxy-functionalized siloxane and a silane capable of compatabilizing the epoxy and the alkoxy-functionalized siloxane to provide an interpenetrating polymer network of glass and epoxy.

35. The primer composition according to claim 34, wherein the alkoxy-functionalized siloxane is selected from the group consisting of polydiethoxysiloxane, polydimethoxysiloxane, tetramethoxy silane and tetraethoxy silane.

36. The primer composition according to claim 34, wherein the primer composition is crosslinked using an organotitanate or tin catalyst agent.

37. The primer composition according to claim 34, further including a filler selected from the group consisting of mica, silica, kaolin, bentonite, talc, zinc oxide, polytetrafluoroethylene powder, ultrahigh molecular weight polyethylene powder, high molecular weight polyethylene powder, medium and low molecular weight polyethylene powder, fumed silica, iron oxide and cellulose.

38. The primer composition according to claim 34, wherein the epoxy is a polyglycidyl ether of a polyhydric polyol.

39. A substrate coated with the primer coating according to claim 34.

40. A primer composition, comprising:
   10 to 35 percent by weight of an epoxy;
   10 to 25 percent by weight of an alkoxy-functionalized siloxane; and
   6 to 15 percent by weight of a silane capable of compatabilizing the epoxy and the alkoxy-functionalized siloxane.

41. The primer composition according to claim 40, wherein the alkoxy-functionalized siloxane is selected from the group consisting of polydiethoxysiloxane, polydimethoxysiloxane, tetramethoxy silane and tetraethoxy silane.

42. The primer composition according to claim 40, wherein the glassy matrix is crosslinked using an organotitanate or tin catalyst agent.

43. The primer composition according to claim 40, further including a filler selected from the group consisting of mica, silica, kaolin, bentonite, talc, zinc oxide, polytetrafluoroethylene powder, ultrahigh molecular weight polyethylene powder, high, medium and low molecular weight polyethylene powder, fumed silica, iron oxide and cellulose.

44. The primer composition according to claim 40, wherein the epoxy is a polyglycidyl ether of a polyhydric polyol.

45. A substrate coated with the primer composition according to claim 40.

46. A substrate first coated with a primer composition formed by crosslinking a mixture of an epoxy, and alkoxy-functionalized siloxane and a silane capable of compatabilizing the epoxy and the alkoxy-functionalized siloxane; and then coated with an antifouling composition comprising a glassy matrix formed by crosslinking a mixture of a silanol-terminated silicone and an alkoxy-functionalized siloxane; and at least two materials capable of microphase separation, at least one of which is graftable to the glass matrix.

47. The substrate according to claim 46, wherein further including an agent capable of preventing the deposition of slime.

48. The substrate according to claim 47, wherein the agent capable of preventing the deposition of slime is selected from the group consisting of a surfactant, an emulsifier, an enzyme, a quaternary amine compound, a silver compound, a sulfa-based antimicrobial compound, saponin, and cholesterol, and mixtures and blends thereof.

49. The substrate according to claim 46, wherein the functionally-terminated silicone is selected from the group consisting of silanol terminated, vinyl terminated and amine terminated polydimethylsiloxane.

50. The substrate according to claim 46, wherein the alkoxy-functionalized siloxane is selected from the group consisting of polydiethoxysiloxane, polydimethoxysiloxane, tetramethoxy silane and tetraethoxy silane.

51. The substrate according to claim 46, wherein one of the materials capable of microphase separation and graftable into the glassy matrix is vinyl terminated polydimethylsiloxane polymer reacted with dimethylethoxy silane and triethyl silane using a hydrosilylation reaction.

52. The substrate according to claim 46, wherein one of the materials capable of microphase separation is polydecene.

53. The substrate according to claim 46, wherein one of the materials capable of microphase separation is a fluorotelomer intermediate.

54. The substrate according to claim 46, wherein one of the materials of microphase separation and graftable into the glassy matrix is derived from a carboxylic acid containing a linear carbon chain of up to about C20.

55. The substrate according to claim 46, wherein the carboxylic acid is selected from the group consisting of octanoic acid, heptanoic acid, hexanoic acid, decanoic acid, lauric acid, oleic acid, linoleic acid, linolenic acid and stearic acid.

56. The substrate according to claim 46, wherein one of the materials capable of microphase separation is derived from a metal fatty acid complex.

57. The substrate according to claim 46, wherein the metal fatty acid complex is selected from the group consisting of aluminum, magnesium, calcium and copper oleate and aluminum, magnesium, calcium, and copper stearate.

58. The substrate according to claim 46, wherein one of the materials capable of microphase separation and graftable into the glassy matrix is an alkylhydrosiloxane polymer side-chained grafted with an alkene and vinyltriethoxy silane using a hydrosilylation reaction.

59. The substrate according to claim 46, wherein the alkylhydrosiloxane polymer is methylhydroxysiloxane and the alkene is octene or styrene.

60. The substrate according to claim 46, wherein the glassy matrix is crosslinked using an organotitanate or tin catalyst agent.

61. The substrate according to claim 46, wherein further including a filler selected from the group consisting of mica, silica, kaolin, bentonite, talc, zinc oxide, polytetrafluoroethylene powder, ultrahigh molecular weight polyethylene powder, high molecular weight polyethylene powder, medium and low molecular weight polyethylene powder, fumed silica, iron oxide and cellulose.

62. The substrate according to claim 46, wherein the primer composition comprises 10 to 35 percent by weight of an epoxy; 10 to 25 percent by weight of an alkoxy-functionalized siloxane; and 6 to 15 percent by weight of a silane capable of compatabilizing the epoxy and the alkoxy-functionalized siloxane; and the antifouling composition comprises 20 to 90 percent by weight of a glassy matrix formed by crosslinking a mixture of a silanol-terminated silicone and an alkoxy-functionalized siloxane; 1 to 30 percent by weight of at least two materials capable of microphase separation; and 0.1 to 25 percent by weight of an agent capable of preventing slime.

63. A method of treating a substrate to prevent fouling due to immersion in or contact with seawater, the method comprising the steps of (a) applying to the substrate a primer composition comprising a mixture of an epoxy, an alkoxy-functionalized siloxane and a silane capable of compatabilizing the epoxy and the alkoxy-functionalized siloxane;

(b) crosslinking the primer composition;

(c) then applying to the substrate an antifouling composition comprising a glassy matrix formed by crosslinking a mixture of a silanol-terminated silicone and an alkoxy-functionalized siloxane; and at least two materials capable of microphase separation, at least one of which is graftable to the glassy matrix; and (d) crosslinking the glassy matrix.

64. The method according to claim 63, wherein the primer composition mixture is crosslinked using an organotitanate or tin catalyst agent.

65. The method according to claim 63, wherein the glassy matrix is crosslinked using an organotitanate or tin catalyst agent.

66. The method according to claim 65, wherein the primer composition and the antifouling composition are crosslinked substantially simultaneously.

67. A kit for treating a substrate to provide antifouling properties to the substrate, the kit a primer composition comprising a mixture of an epoxy, an alkoxy-functionalized siloxane and a silane capable of compatabilizing the epoxy and the alkoxy-functionalized siloxane; an antifouling composition comprising a glassy matrix formed by crosslinking a mixture of a silanol-terminated silicone and an alkoxy-functionalized siloxane and at least two materials capable of microphase separation, at least one of which is graftable to the glassy matrix; and a crosslinking agent.

68. A kit according to claim 67, further including an agent capable of preventing the deposition of slime.

69. A kit according to claim 67, wherein the agent capable of preventing the deposition of slime is selected from the group consisting of a surfactant, an emulsifier, an enzyme, a quaternary amine compound, a silver compound a sulfa-based antimicrobial compound, saponin, and cholesterol, and mixtures and blends thereof.

70. A kit according to claim 67, wherein the functionally-terminated silicone is selected from the group consisting of silanol terminated, vinyl terminated and amine terminated polydimethylsiloxane.

71. A kit according to claim 67, wherein the alkoxy-functionalized siloxane is selected from the group consisting of polydiethoxysiloxane, polydimethoxysiloxane, tetramethoxy silane and tetraethoxy silane.

72. A kit according to claim 67, wherein one of the materials capable of microphase separation and graftable into the glassy matrix is vinyl terminated polydimethylsiloxane polymer reacted with dimethylethoxy silane and triethyl silane using a hydrosilylation reaction.

73. A kit according to claim 67, wherein one of the materials capable of microphase separation is polydecene.

74. A kit according to claim 67, wherein one of the materials capable of microphase separation is a fluorotelomer intermediate.

75. A kit according to claim 67, wherein one of the materials of microphase separation and graftable into the glassy matrix is derived from a carboxylic acid containing a linear carbon chain of up to about C20.

76. A kit according to claim 67, wherein the carboxylic acid is selected from the group consisting of octanoic acid, heptanoic acid, hexanoic acid, decanoic acid, lauric acid, oleic acid, linoleic acid, linolenic acid and stearic acid.

77. A kit according to claim 67, wherein one of the materials capable of microphase separation is derived from a metal fatty acid complex.

78. A kit according to claim 67, wherein the metal fatty acid complex is selected from the group consisting of aluminum, magnesium, calcium and copper oleate and aluminum, magnesium, calcium, and copper stearate.

79. A kit according to claim 67, wherein one of the materials capable of microphase separation and graftable into the glassy matrix is an alkylhydrosiloxane polymer side-chained grafted with an alkene and vinyltriethoxy silane using a hydrosilylation reaction.

80. A kit according to claim 67, wherein the alkylhydrosiloxane polymer is methylhydroxysiloxane and the alkene is octene or styrene.

81. A kit according to claim 67, wherein the crosslinking agent is an organotitanate or a tin catalyst.

82. A kit according to claim 67, further including a filler selected from the group consisting of mica, silica, kaolin, bentonite, talc, zinc oxide, polytetrafluoroethylene powder, ultrahigh molecular weight polyethylene powder, high molecular weight polyethylene powder, medium and low molecular weight polyethylene powder, fumed silica, iron oxide and cellulose.

* * * * *